(12) United States Patent
Matsushita

(10) Patent No.: US 8,905,205 B2
(45) Date of Patent: Dec. 9, 2014

(54) BICYCLE HYDRAULIC COMPONENT OPERATING DEVICE

(71) Applicant: Shimano Inc., Osaka (JP)

(72) Inventor: Tatsuya Matsushita, Osaka (JP)

(73) Assignee: Shimano Inc., Osaka (JP)

( * ) Notice: Subject to any disclaimer, the term of this patent is extended or adjusted under 35 U.S.C. 154(b) by 37 days.

(21) Appl. No.: 13/726,799

(22) Filed: Dec. 26, 2012

(65) Prior Publication Data

US 2014/0174866 A1 Jun. 26, 2014

(51) Int. Cl.
*B62L 3/02* (2006.01)
*B62K 23/06* (2006.01)

(52) U.S. Cl.
CPC *B62L 3/023* (2013.01); *B62K 23/06* (2013.01)
USPC ........................................................ 188/344

(58) Field of Classification Search
USPC ........................................ 188/24.11, 26, 344
See application file for complete search history.

(56) References Cited

U.S. PATENT DOCUMENTS

| | | | |
|---|---|---|---|
| 3,993,174 A | 11/1976 | Williams et al. | |
| 4,175,648 A | 11/1979 | Sule | |
| 4,391,353 A | 7/1983 | Mathauser | |
| 4,615,415 A | 10/1986 | Mathauser | |
| 4,921,081 A | 5/1990 | Chilcote | |
| 7,137,492 B2 * | 11/2006 | Laghi | 188/344 |
| 7,857,112 B1 * | 12/2010 | Tsai et al. | 188/344 |
| 2007/0131495 A1 | 6/2007 | Matsushita et al. | |
| 2007/0131503 A1 | 6/2007 | Matsushita et al. | |
| 2009/0031841 A1 | 2/2009 | Tetsuka | |
| 2010/0064838 A1 | 3/2010 | Siew et al. | |
| 2010/0186538 A1 | 7/2010 | Tetsuka | |
| 2011/0147149 A1 | 6/2011 | Tetsuka et al. | |
| 2011/0240425 A1 * | 10/2011 | Hirose et al. | 188/344 |

FOREIGN PATENT DOCUMENTS

| | | |
|---|---|---|
| CN | 201999156 U | 10/2011 |
| TW | M412125 U | 9/2011 |

OTHER PUBLICATIONS

U.S. Appl. No. 13/449,726, filed Apr. 18, 2012.
U.S. Appl. No. 13/435,202, filed Mar. 30, 2012.

* cited by examiner

*Primary Examiner* — Christopher Schwartz
(74) *Attorney, Agent, or Firm* — Global IP Counselors

(57) ABSTRACT

A bicycle hydraulic component operating device has a main body, a hydraulic cylinder, a piston, an operating lever, a fluid reservoir tank, and a communication port. The main body includes a handlebar mounting portion and a gripping portion. The piston is movably disposed within the hydraulic cylinder. The operating lever is pivotally disposed around a pivot axis relative to the main body. The operating lever is operatively connected with one of the hydraulic cylinder and the piston to generate a hydraulic force in response to pivotal movement of the operating lever relative to the main body. The fluid reservoir tank is in fluid communication with the hydraulic cylinder. The communication port is in communication with the fluid reservoir tank.

20 Claims, 9 Drawing Sheets

BICYCLE HYDRAULIC COMPONENT OPERATING DEVICE

BACKGROUND

1. Field of the Invention

The present invention generally relates to a bicycle hydraulic component operating device. More specifically, the present invention relates to a bicycle hydraulic component operating device for operating a bicycle component.

2. Background Information

In recent years, some bicycles have been provided with a hydraulically operated system. In the case of bicycle brake systems, hydraulic disc brake systems or other brake types of hydraulic brake system such as hydraulic shoe brakes are known. The hydraulic brake systems are typically actuated by a brake lever that is attached to a bicycle handlebar. The brake lever is typically part of a brake operating device that attaches the brake lever to the bicycle handlebar. The brake operating device typically includes a master piston that is slidably disposed in a cylinder bore of a master cylinder, and which is actuated by the brake lever. The master cylinder contains a hydraulic fluid. The cylinder bore of the master cylinder is in fluid communication with a disc brake caliper housing in the case of a hydraulic disc brake via a fluid conduit. Brake pads of the disc brake caliper housing are typically spaced apart from a rotor by a predetermined gap. As the brake lever is operated (i.e., contracted towards the handlebar), the master piston moves in the cylinder bore of the master cylinder to force hydraulic fluid out of the master cylinder and into the fluid conduit connected to the caliper housing. The movement of fluid into the caliper housing causes the pistons in the caliper housing to move, and eventually brings the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

SUMMARY

It has been discovered that with the conventional hydraulically operated components, it can be difficult to bleed the hydraulic fluid into the hydraulically operated system. In particular, it can be difficult to bleed the hydraulic fluid into the hydraulically operated system while the hydraulically operated system is installed to the bicycle. One object presented in the present disclosure is to provide a bicycle hydraulic component operating device into which hydraulic fluid can be easily bled.

In view of the state of the known technology, a bicycle hydraulic component operating device is provided that basically includes a main body, a hydraulic cylinder, a piston, an operating lever, a fluid reservoir tank, and a communication port. The main body includes a handlebar mounting portion and a gripping portion. The piston is movably disposed within the hydraulic cylinder. The operating lever is pivotally disposed around a pivot axis relative to the main body. The operating lever is operatively connected with one of the hydraulic cylinder and the piston to generate a hydraulic force in response to pivotal movement of the operating lever relative to the main body. The fluid reservoir tank is in fluid communication with the hydraulic cylinder. The communication port is in communication with the fluid reservoir tank.

These features and other features, objects, aspects and advantages of the disclosed bicycle hydraulic component operating device will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 10, a bicycle hydraulic brake operating device 10 (e.g., a bicycle hydraulic component operating device) is illustrated in accordance with a first embodiment. As illustrated in FIGS. 1 to 4, the bicycle hydraulic brake operating device 10 (hereinafter "bicycle hydraulic operating device 10") is a right hand side control device operated by the rider's right hand to operate a first brake device (not shown) and a first gear shifting device (not shown, e.g., an electric rear derailleur). It will be apparent to those skilled in the bicycle field that the configuration of the bicycle hydraulic operating device 10 can be adapted to a left hand side control device that is operated by the rider's left hand.

Figure 1:
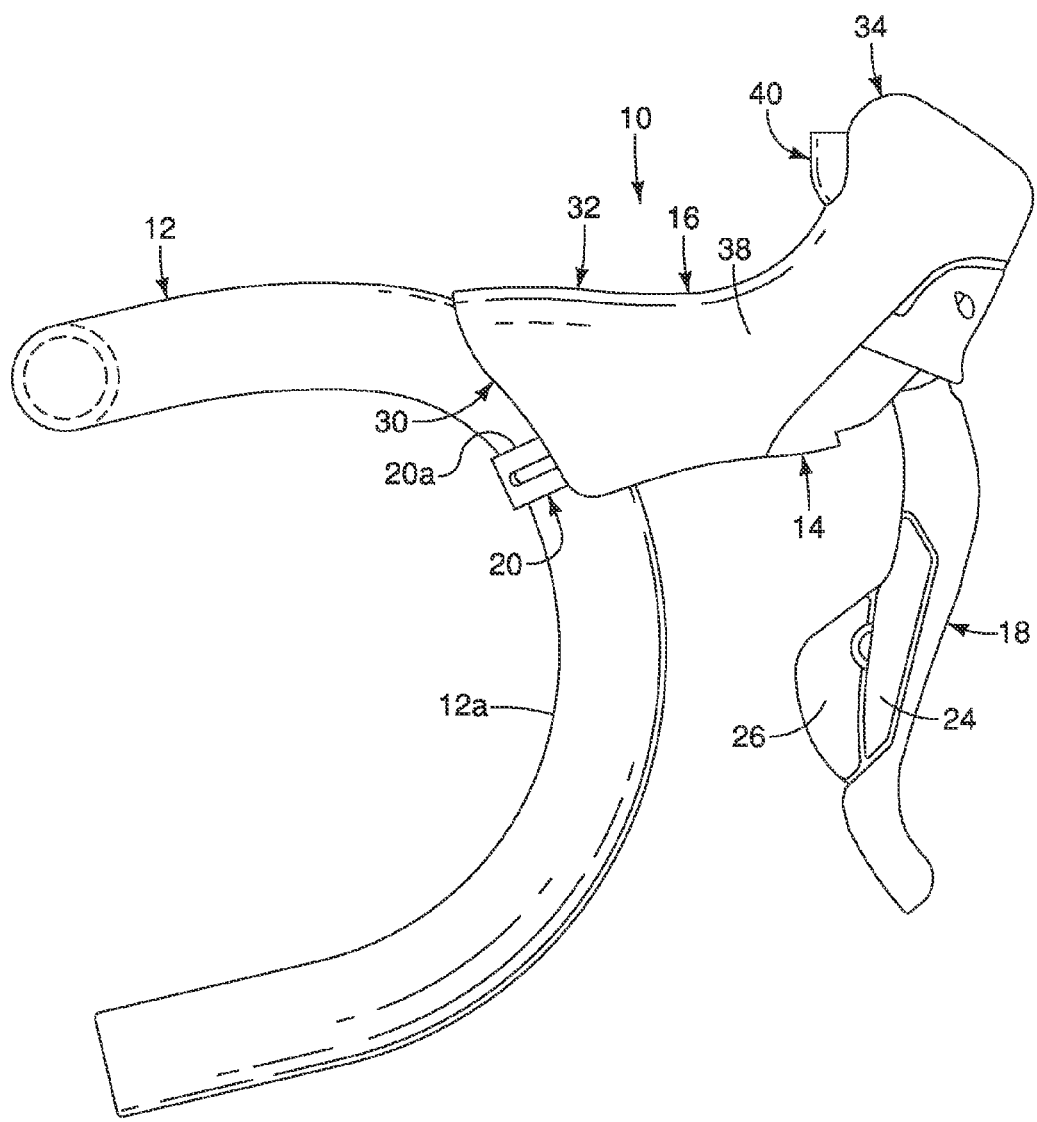
FIG. 1 is an outside elevational view of a dropdown bicycle handlebar that is equipped with a bicycle hydraulic operating device in accordance with a first embodiment.

As seen in FIG. 1, the bicycle hydraulic operating device 10 is mounted to a dropdown bicycle handlebar 12. In particular, the bicycle hydraulic operating device 10 is mounted to a curved section 12a of the dropdown bicycle handlebar 12. In other words, the bicycle hydraulic operating device 10 is particularly designed for a bicycle that is equipped with the dropdown bicycle handlebar 12. As explained below, the bicycle hydraulic operating device 10 includes both a braking function and a shifting function in a single unit. However, it will be apparent to those skilled in the bicycle field from this disclosure that the shifting function could be eliminated from the bicycle hydraulic operating device 10 if needed and/or desired. The bicycle hydraulic operating device 10 is a bicycle hydraulic brake operating device that is specifically designed to be mounted to the curved section 12a of the dropdown bicycle handlebar 12. However, it will be apparent to those skilled in the bicycle field from this disclosure that the bicycle hydraulic operating device 10 could be applied to different types of handlebars if needed and/or desired.

In the illustrated embodiment, the bicycle hydraulic operating device 10 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 12a of the dropdown bicycle handlebar 12, as illustrated in FIG. 1, and that includes both braking and shifting functions in a single unit.

As illustrated in FIGS. 1 to 4, the bicycle hydraulic operating device 10 basically includes a main body 14 with a hydraulic system 16, and an operating lever 18. The bicycle hydraulic operating device 10 also includes a handlebar fastener 20 (e.g., a handlebar mounting member). In the illustrated embodiment, since the bicycle hydraulic operating device 10 is configured to actuate a brake device (not shown), the operating lever 18 will hereinafter be referred to as the "brake lever 18". Thus, the brake lever 18 actuates the hydraulic system 16 upon movement of the brake lever 18 relative to the main body 14 to perform a braking operation of the brake device (not shown).

Figure 3:
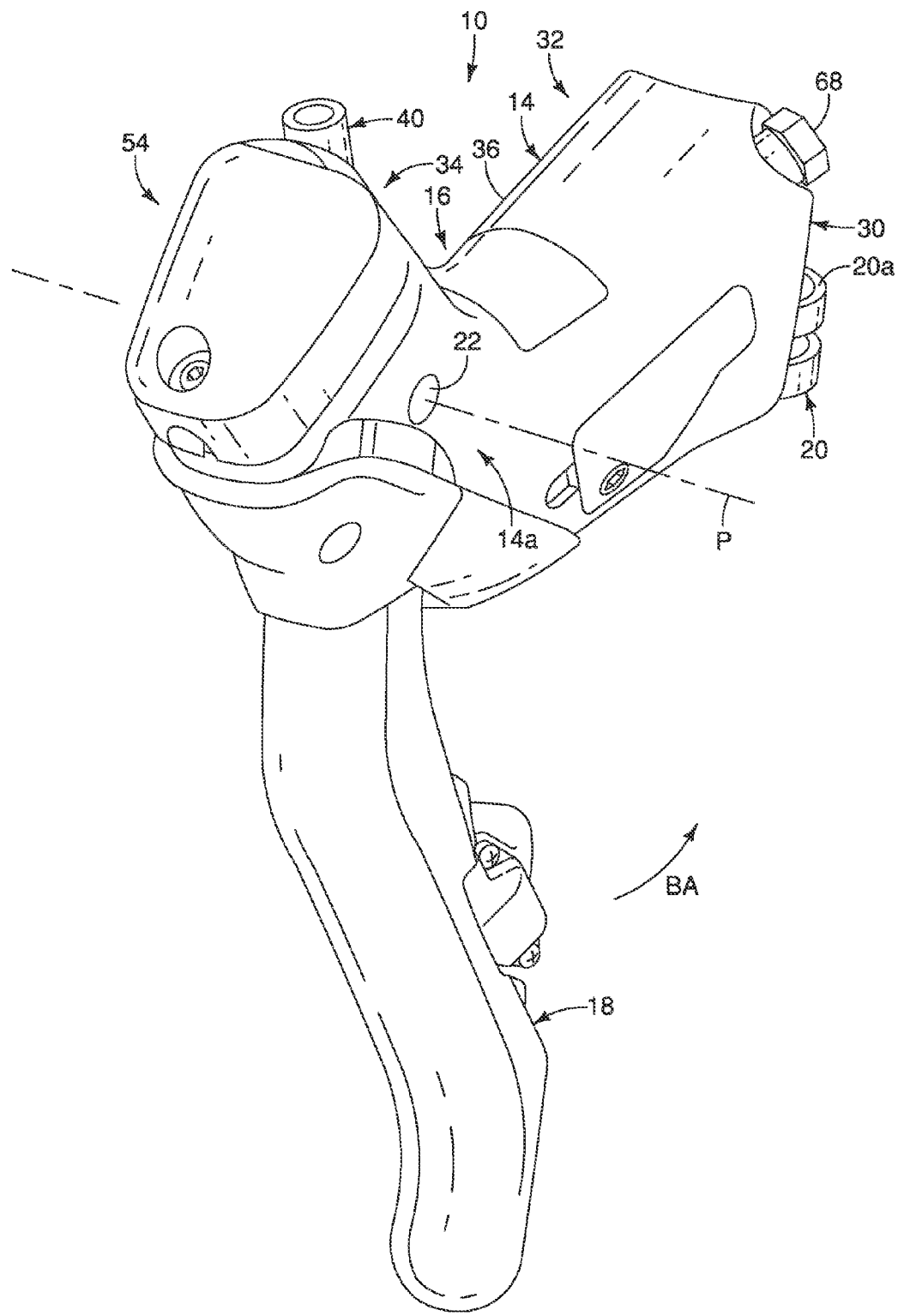
FIG. 3 is a front perspective view of the bicycle hydraulic operating device illustrated in FIG. 2.

As illustrated in FIG. 3, the brake lever 18 is pivotally disposed around a pivot axis P relative to the main body 14. In the illustrated embodiment, the brake lever 18 is directly pivotally mounted to a lever mounting portion 14a of the main body 14 by a pivot pin 22 that defines the pivot axis P. As explained below, the brake lever 18 is biased to a rest position with respect to the main body 14. Thus, the brake lever 18 moves relative to the main body 14 from the rest position along a brake operating path BA to a braking position for performing a braking operation of the brake device (not shown).

In the illustrated embodiment, the brake lever 18 is provided with a pair of gearshift operating parts 24 and 26 for performing gearshifting operations of a gear changing device (not shown). The gearshift operating parts 24 and 26 are electrically connected to a gearshift control unit (not shown) that is mounted within a recess in the main body 14. The gearshift operating parts 24 and 26 are constructed as shown in U.S. Patent Application Publication No. 2009/0031841 A1 (assigned to Shimano, Inc.). It will be apparent to those skilled in the bicycle field that the gearshift operating parts 24 and 26 are not limited to the illustrated structure and arrangement, but rather other suitable structures and arrangements can be used as needed and/or desired. The gearshift control unit (not shown) is a microcomputer that is located in the main body 14. However, the gearshift control unit can be remotely located if needed and/or desired. Since various electrical shifting systems are known in the bicycle field, the gearshift operating parts 24 and 26 and the gearshift control unit will not be discussed herein for the sake of brevity.

Figure 2:
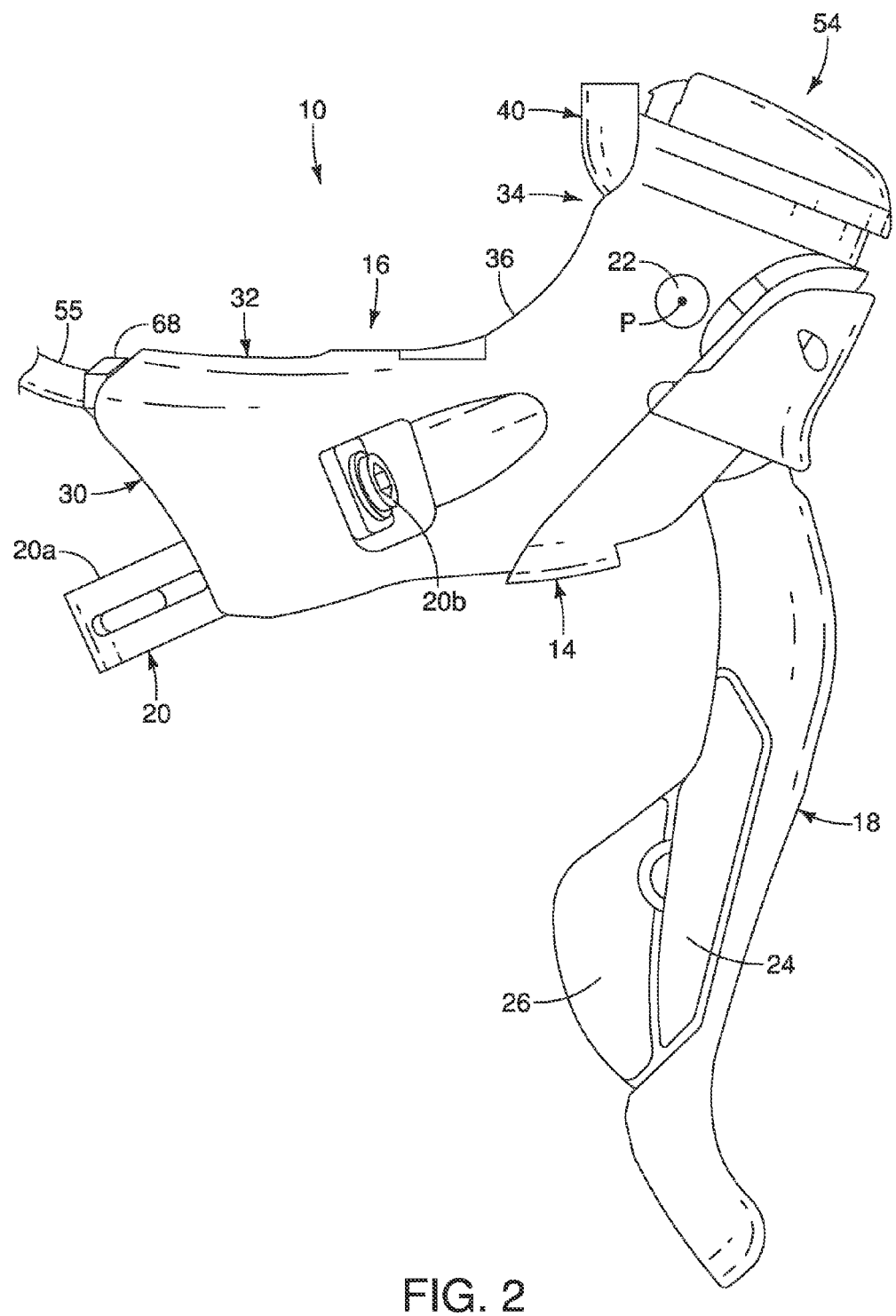
FIG. 2 is an outside elevational view of the bicycle hydraulic operating device illustrated in FIG. 1 with a grip cover removed.
Figure 4:
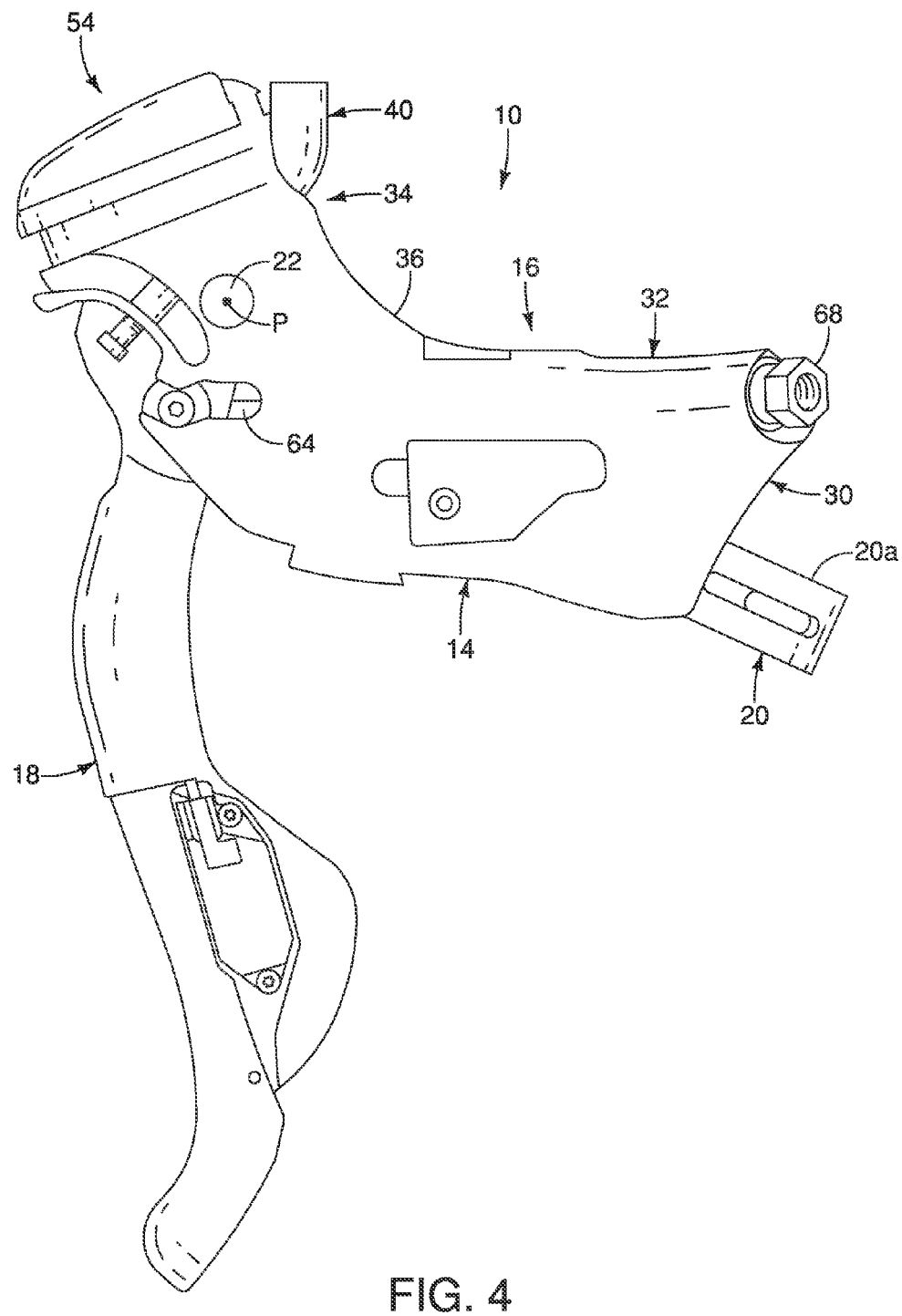
FIG. 4 is an inside elevational view of the bicycle hydraulic operating device illustrated in FIG. 2.

As illustrated in FIGS. 2 to 4, the main body 14 has a handlebar mounting portion 30 (e.g., a handlebar mounting portion that is integrally formed at one end for contacting the dropdown bicycle handlebar 12. The handlebar mounting portion 30 has the handlebar fastener 20 attached thereto. Thus, the handlebar fastener 20 and the handlebar mounting portion 30 constitute a handlebar mounting structure. In this way, in the illustrated embodiment, the handlebar mounting structure (the handlebar fastener 20 and the handlebar mounting portion 30) is disposed on the main body 14. While the handlebar mounting portion 30 is an integral part of the main body 14, the handlebar fastener 20 can be a separate part that is fixedly attached to the main body 14.

The main body 14 includes a gripping portion 32 and a pommel portion 34. The handlebar mounting portion 30 is integrally formed with the gripping portion 32 of the main body 14 in the illustrated embodiment. The main body 14 together with the handlebar mounting portion 30 defines a drop down handlebar bracket which is made of a rigid, hard material. The gripping portion 32 is located at a middle portion of the drop down handlebar bracket. The pommel portion 34 is located at a forward free end of the drop down handlebar bracket in other words, the gripping portion 32 is disposed between the handlebar mounting portion 30 and the pommel portion 34 along a longitudinal axis of the main body 14 that is substantially parallel to a longitudinal axis of a bicycle. More specifically, the pommel portion 34 is located forward of the main body 14 relative to a transition point on a top surface 36 of the main body 14. In the illustrated embodiment, the top surface 36 of the main body 14 becomes more vertical than horizontal at the transition point as moving forward of the main body 14 along the longitudinal axis of the main body 14. In the illustrated embodiment, basically, the handlebar mounting portion 30, the gripping portion 32 and the pommel portion 34 are formed as a one-piece, unitary member. Of course, the handlebar mounting portion 30, the gripping portion 32 and the pommel portion 34 can have removable panels as needed and/or desired. For example, an outer panel of the gearshift control unit can defines a portion of the gripping portion 32.

As illustrated in FIG. 1, a grip cover 38 is stretched over at least the gripping portion 32 and a pommel portion 34 to provide a cushion to the gripping portion 32 of the main body 14 and to provide an attractive appearance. Typically, the grip cover 38 is made of elastic material such as rubber.

The handlebar fastener 20 is a conventional handlebar clamp that is attached to the main body 14 for releasably securing the main body 14 to the curved section 12a of the dropdown bicycle handlebar 12. As illustrated in FIG. 2, the handlebar fastener 20 basically includes a clamping band 20a and a first fastener part 20b that screws to a second fastener part (not shown) of the clamping band 20a. The first fastener part 20b and the second fastener part are located in a hole of the handlebar mounting portion 30 in this way, a head of the first fastener part 20b applies a first force on the handlebar mounting portion 30 and the second fastener part applies a second force on the clamping band 20a when the handlebar fastener 20 is tightened to secure the main body 14 to the curved section 12a of the dropdown bicycle handlebar 12. By tightening the first fastener part 20b, the clamping band 20a is moved toward the handlebar mounting portion 30 such that the curved section 12a of the dropdown bicycle handlebar 12 is squeezed between the clamping band 20a and the handlebar mounting portion 30. It will be apparent to those skilled in the bicycle field that the handlebar fastener 20 that is not limited to the illustrated clamp, but rather other suitable mounting mechanisms can be used as needed and/or desired in any case, the handlebar fastener 20 is mounted on the handlebar portion 30 of the main body 14. The handlebar mounting portion 30 contacts the curved section 12a of the dropdown bicycle handlebar 12 when the first fastener part 20b is tightened to move the clamping band 20a towards the handlebar mounting portion 30.

Referring mainly to FIG. 2, the hydraulic system 16 is in fluid communication with a hydraulic disc brake system (not shown) by a hydraulic hose or tube 55. Basically, operation of the brake lever 18 causes hydraulic fluid to move from the hydraulic system 16 to a slave piston or pistons in a hydraulic brake caliper such that brake pads come into contact with a rotor for applying frictional resistance and causing the bicycle to slow down or stop. Of course, the bicycle hydraulic operating device 10 is not limited to being used with a hydraulic disc brake system. Rather, the bicycle hydraulic operating device 10 can be used with other brake system such as hydraulic shoe brakes.

As illustrated FIGS. 5 to 9, the bicycle hydraulic operating device 10 includes a communication port 40. The hydraulic system 16 also includes a fluid reservoir tank 54, a hydraulic cylinder housing 56 (e.g., a hydraulic cylinder) and a piston 58. The hydraulic cylinder housing 56 is often called a master cylinder and the piston 58 is often called a master piston. The piston 58 is movably disposed within a cylinder bore 60 of the hydraulic cylinder housing 56.

Figure 6:
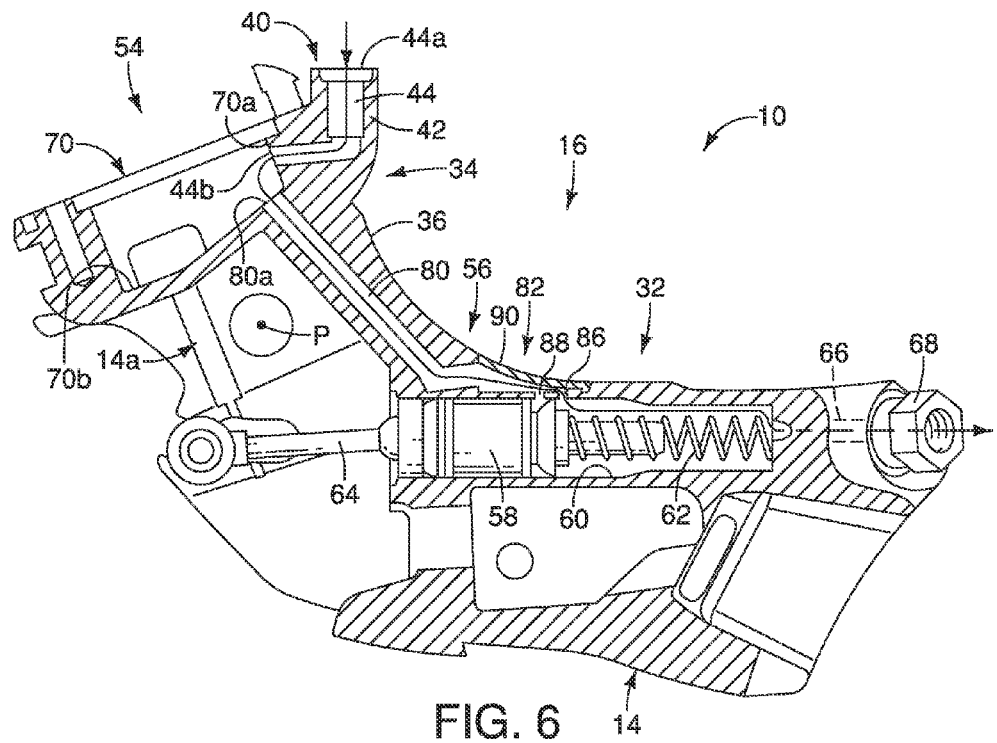
FIG. 6 is a center longitudinal cross sectional view of a main body of the bicycle hydraulic operating device illustrated in FIGS. 1 to 5 as seen along section line 6-6 of FIG. 9, illustrating the main body oriented in an installed orientation.
Figure 10:
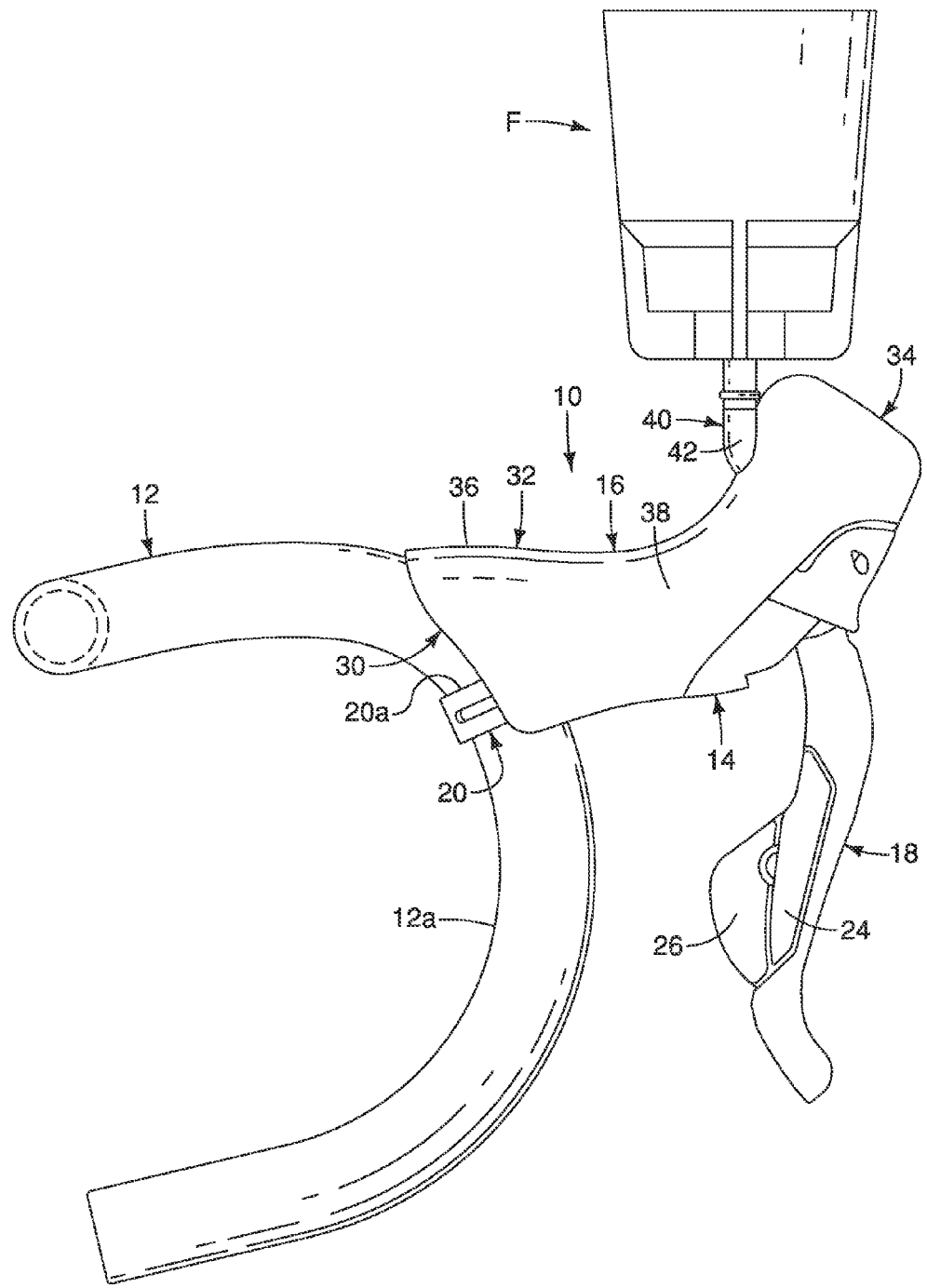
FIG. 10 is an outside elevational view of the bicycle hydraulic operating device illustrated in FIG. 1, with an oil funnel attached for bleeding hydraulic fluid.

In the illustrated embodiment, as best seen in FIG. 6, the communication port 40 is in communication with the fluid reservoir tank 54. In particular, the communication port 40 basically includes an annular protrusion 42 with a communication passageway 44. The protrusion 42 of the communication port 40 is disposed on the top surface 36 of the main body 14. In particular, the protrusion 42 of the communication port 40 extends or protrudes from the top surface 36 of the main body 14 at the pommel portion 34. As illustrated in FIG. 10, the protrusion 42 of the communication port 40 is formed as a funnel mounting portion to which an oil funnel F is configured to be mounted for adding the hydraulic fluid into or bleeding air from the hydraulic system 16. In particular, the protrusion 42 of the communication port 40 has an annular flat end face to which the oil funnel F is mounted. The end face of the protrusion 42 extends substantially horizontally while the bicycle hydraulic operating device 10 is in an installed position. Thus, even if the main body 14 does not have a flat portion on the top surface 36, the oil funnel F can be mounted on the flat end face of the protrusion 42 in a stable manner. As shown in FIG. 6, the communication passageway 44 extends through the communication port 40. The communication passageway 44 of the communication port 40 has an outer end opening 44a that opens upward while the bicycle hydraulic operating device 10 is in an installed position. As illustrated in FIG. 6, the communication passageway 44 of the communication port 40 fluidly communicates with the cylinder bore 60 of the hydraulic cylinder housing 56 via the fluid reservoir tank 54. In the illustrated embodiment, the communication passageway 44 of the communication port 40 has an inner end opening 44b that opens into the fluid reservoir tank 54. Thus, the communication port 40 communicates the fluid reservoir tank 54 with an external space outside the main body 14 via the communication passageway 44. Of course, it will be apparent to those skilled in the bicycle field from this disclosure that the communication port 40 is provided with a removable cap for sealing the communication port 40 or preventing the hydraulic fluid in the fluid reservoir tank 54 from draining out of the communication port 40 while riding the bicycle.

In the illustrated embodiment, the fluid reservoir tank 54 is disposed on the pommel portion 34 of the main body 14. In particular, the fluid reservoir tank 54 is disposed at an upper side of the main body 14 relative to the pivot axis P of the brake lever 18 while the bicycle hydraulic operating device 10 is in the installed position. Also in the illustrated embodiment, the fluid reservoir tank 54 is at least partially disposed on the main body 14 at a location primarily forward of the pivot axis P of the brake lever 18 while the bicycle hydraulic operating device 10 is in the installed position. The fluid reservoir tank 54 is disposed above the hydraulic cylinder housing 56 at a location on the pommel portion 34 of the main body 14. Of course, it will be apparent to those skilled in the bicycle field from this disclosure that the fluid reservoir tank 54 is not limited to the illustrated location, but rather other suitable locations can also be used. In any case, the location of the fluid reservoir tank 54 is supported by the main body 14 at a location spaced from an area directly above the hydraulic cylinder housing 56 while the bicycle hydraulic operating device 10 is in an installed position.

In the illustrated embodiment, the hydraulic cylinder housing 56 is disposed on the main body 14. In particular, the hydraulic cylinder housing 56 is disposed within the gripping portion 32 of the main body 14. The brake lever 18 is operatively connected with the piston 58 to move the piston 58 within the cylinder bore 60 such that a hydraulic force is generated in response to pivotal movement of the brake lever 18 relative to the main body 14. Also, the brake lever 18 can be operatively connected with the hydraulic cylinder housing 56 to generate a hydraulic force in response to pivotal movement of the brake lever 18 relative to the main body 14.

As shown in FIG. 6, the piston 58 is movably disposed within the cylinder bore 60 of the hydraulic cylinder housing 56 in a reciprocal manner in response to operation of the brake lever 18. The piston 58 and the internal surface of the cylinder bore 60 define a hydraulic chamber of the hydraulic system 16. A biasing element 62 is disposed in the cylinder bore 60 for biasing the piston 58 to a rest position. In the illustrated embodiment, the biasing element 62 is a coil compression spring (return spring) that also biases the brake lever 18 to its rest position as seen in FIG. 6. As illustrated in FIGS. 4 and 6, the brake lever 18 is operatively connected to the piston 58 by a connecting rod 64.

In the illustrated embodiment, the connecting rod 64 is connected to the brake lever 18 with a reach adjustment connection (not illustrated) that adjusts the reach of the brake lever 18. The illustrated reach adjustment connection between the connecting rod 64 and the brake lever 18 substantially similar in construction to the reach adjustment connection that is disclosed in U.S. Patent Application Publication No. 2011/0147149 A1 (assigned to Shimano, Inc.). Also, the main body 14 includes a piston end position adjustment connection that controls relative positions of the brake lever 18 and the piston 58 in their rest positions with respect to the hydraulic cylinder housing 56.

Figure 9:
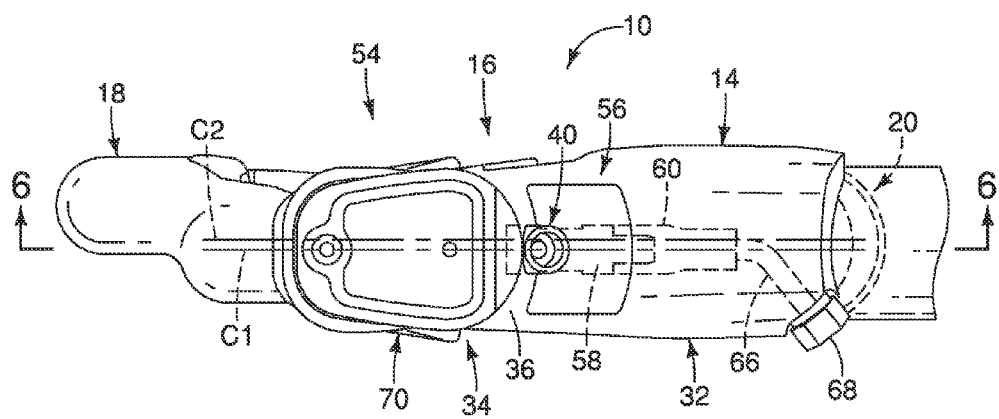
FIG. 9 is a top plan view of the bicycle hydraulic operating device illustrated in FIG. 1 with a cover for a fluid reservoir tank removed.

As illustrated in FIGS. 6 and 9, the hydraulic cylinder housing 56 has an outlet port 66 that extends from the cylinder bore 60 to a hydraulic hose connector 68. The outlet port 66 is partially threaded to receive the hydraulic hose connector 68 for attaching the hydraulic hose 55 (FIG. 2). The hydraulic hose connector 68 extends outside of the main body 14 for attaching the hydraulic hose 55. As the brake lever 18 is pivoted around the pivot axis P relative to the main body 14, the piston 58 moves within the cylinder bore 60 of the hydraulic cylinder housing 56 against the force of the biasing element 62 to force hydraulic fluid out of the cylinder bore 60 through the outlet port 66. As illustrated in FIG. 9, the cylinder bore 60 is arranged relative to the main body 14 such that the cylinder bore 60 has a center axis C1 that is laterally offset from a center axis C2 of the handlebar fastener 20.

Figure 5:
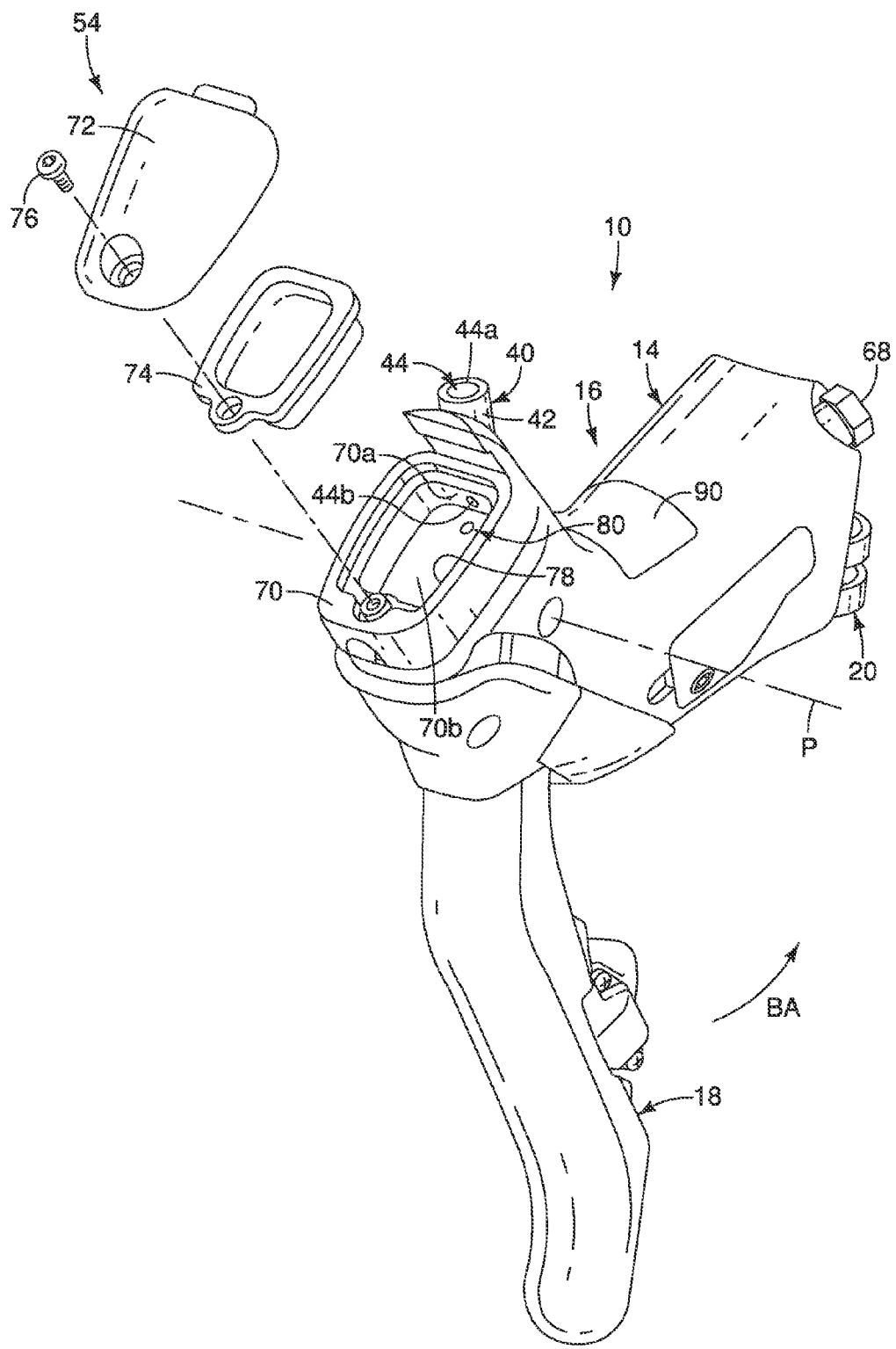
FIG. 5 is a partially exploded perspective view of the bicycle hydraulic operating device illustrated in FIG. 2.

As illustrated in FIGS. 5 and 6, the fluid reservoir tank 54 includes a reservoir 70, a cover 72 and a flexible diaphragm 74. The flexible diaphragm 74 is disposed between the reservoir 70 and the cover 72. The cover 72 and the flexible diaphragm 74 are attached to the reservoir 70 by a screw 76 such that the cover 72 covers a hydraulic fluid chamber 78 defined by the reservoir 70. The flexible diaphragm 74 includes a protruding part that is extends into the hydraulic fluid chamber 78. In the illustrated embodiment, the hydraulic cylinder housing 56 and the reservoir 70, which defines the hydraulic fluid chamber 78 of the fluid reservoir tank 54, are provided as apart of a unitary, one-piece member. In other words, the reservoir 70 is integrally formed with the main body 14 as a one-piece, unitary member. The fluid reservoir tank 54 is in fluid communication with the cylinder bore 60 of the hydraulic cylinder housing 56 by an internal passageway 80. More specifically, the remote end of the internal passageway 80 with respect to the reservoir 70 has an enlarged area 82 with a timing port 86 and a compensation port 88, both of which are in fluid communication with the cylinder bore 60. The functions of the timing port 86 and the compensation port 88 are well known and will not be described further. A removable plate 90 is fixedly coupled to the main body 14 to cover or seal the enlarged area 82.

Figure 7:
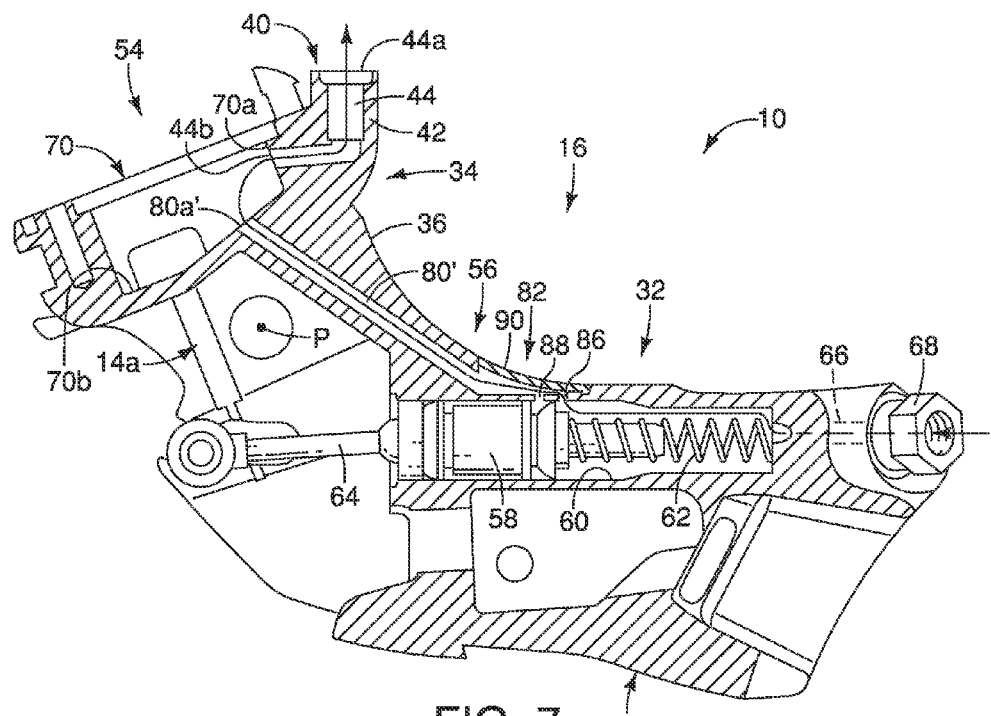
FIG. 7 is a center longitudinal cross sectional view of a modified main body of the bicycle hydraulic operating device, illustrating the main body oriented in an installed orientation.
Figure 8:
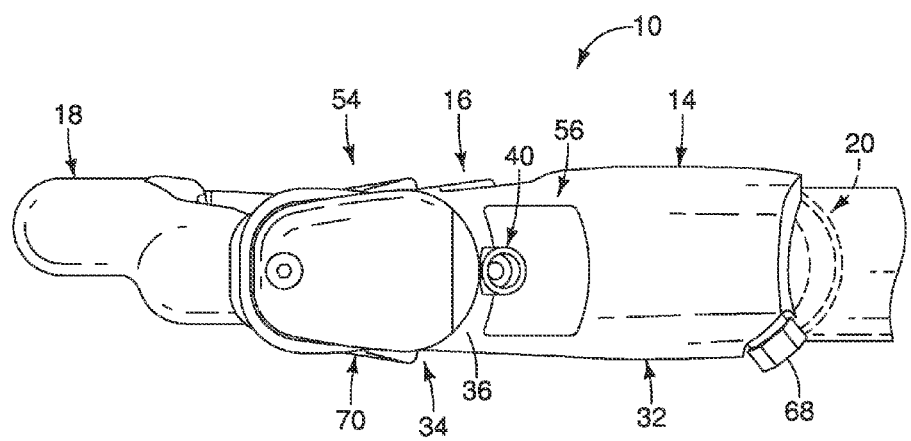
FIG. 8 is a top plan view of the bicycle hydraulic operating device illustrated in FIG. 1 with the grip cover removed.

In the illustrated embodiment, as illustrated in FIGS. 5 and 6, the communication passageway 44 of the communication port 40 has the inner end opening 44b in an inner peripheral face 70a of the reservoir 70 of the fluid reservoir tank 54. In particular, the inner end opening 44b is open in the inner peripheral face 70a at a rear side of the reservoir 70. Furthermore, the inner end opening 44b of the communication passageway 44 of the communication port 40 is located above a bottom face 70b of the reservoir 70 of the fluid reservoir tank 54 while the bicycle hydraulic operating device 10 is in an installed position. In the illustrated embodiment, the communication passageway 44 of the communication port 40 fluidly communicates with the cylinder bore 60 via the fluid reservoir tank 54 and the entire length of the internal passageway 80 that extends between the fluid reservoir tank 54 and the cylinder bore 60. In the illustrated embodiment, as illustrated in FIG. 6, the internal passageway 80 has an end opening 80a that opens into the fluid reservoir tank 54. In the illustrated embodiment, the end opening 80a is located in the bottom face 70b of the reservoir 70 of the fluid reservoir tank 54 at a rear edge portion of the bottom face 70b. Of course, it will be apparent to those skilled in the bicycle field from this disclosure that the location of the end opening 80a of the internal passageway 80 could be modified as needed and/or desired. For example, as illustrated in FIG. 7, an end opening 80a' of a modified internal passageway 80' can be forwardly located father from the inner peripheral face 70a of the reservoir 70 than the end opening 80a illustrated in FIG. 6. In this case, an angle of a longitudinal direction of the internal passageway 80' could be flatter relative to a horizontal direction than that of the internal passageway 80 while the bicycle hydraulic operating device 10 is in an installed position.

As illustrated in FIG. 6, when the hydraulic fluid is added into the hydraulic system 16 from the oil funnel F (FIG. 10), the outer end opening 44a of the communication port 40 serves as an inlet of the fluid reservoir tank 54 for bleeding hydraulic fluid into the cylinder bore 60. In this case, the hydraulic fluid enters the cylinder bore 60 via the communication passageway 44, the fluid reservoir tank 54, and the internal passageway 80. Furthermore, the hydraulic fluid drains out of the outlet port 66 towards a bicycle brake caliper that is fluidly coupled to the hydraulic system 16 via the hydraulic hose 55, thereby filling the hydraulic system 16 and the hydraulic brake system (not shown) with the hydraulic fluid. On the other hand, as illustrated in FIG. 7, when the hydraulic fluid is added into the hydraulic system 16 from a hydraulic brake caliper via the hydraulic hose 55 (FIG. 2) or when the air in the hydraulic system 16 is bled out of the hydraulic system 16, the outer end opening 44a of the communication port 40 serves as an outlet of the fluid reservoir tank 54 for bleeding hydraulic fluid into the cylinder bore 60 from the hydraulic hose 55 or for bleeding air out of the hydraulic system 16. In this case, when the hydraulic fluid is added to the hydraulic system 16 from a bleed nipple of the hydraulic brake caliper using a syringe (not shown), the hydraulic fluid enters the fluid reservoir tank 54 via the hydraulic hose 55, the outlet port 66, the cylinder bore 60 and the internal passageway 80 to fill the fluid reservoir tank 54. Excess hydraulic fluid of the fluid reservoir tank 54 overflows out of the outer end opening 44a of the communication port 40 via the communication passageway 44 into the oil funnel F. Furthermore, air in the hydraulic fluid in the hydraulic system 16 is also bled from the outer end opening 44a of the communication port 40.

Figure 11:
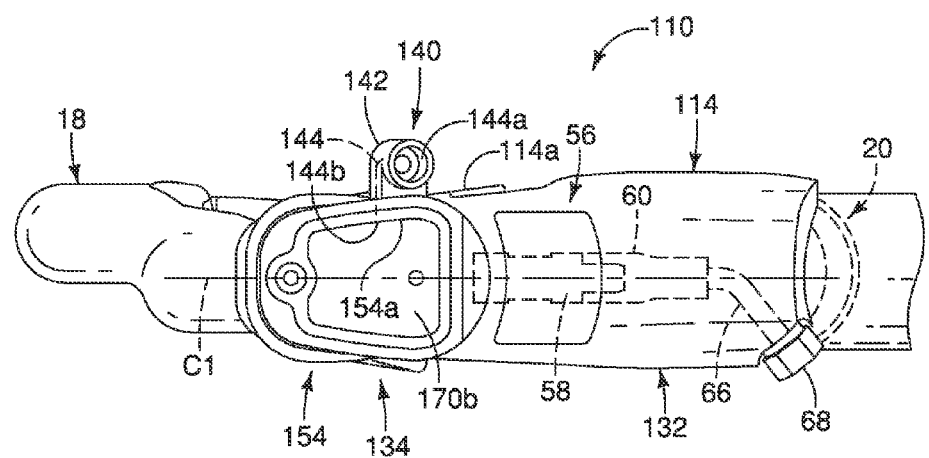
FIG. 11 is a top plan view of a bicycle hydraulic operating device in accordance with a second embodiment.

Referring now to FIG. 11, a bicycle hydraulic operating device 110 (e.g., a bicycle hydraulic component operating device) is illustrated in accordance with a second embodiment. The bicycle hydraulic operating device 110 is basically identical to the bicycle hydraulic operating device 10, except for a location of a communication port 140. In view of the similarity between the first and second embodiments, the bicycle hydraulic operating device 110 will not be discussed in detail for the sake of brevity. Thus, the descriptions of the parts of the second embodiment that are identical or nearly identical to the parts of the first embodiment may be omitted for the sake of brevity. Also in view of the similarity between the first and second embodiments, the parts of the second embodiment that are identical in function to the corresponding parts of the first embodiment will be given the same reference numerals as the parts of the first embodiment, but increased by one hundred.

With the bicycle hydraulic operating device 10 in accordance with the first embodiment, the communication port 40 extends from the top surface 36 of the main body 14 at the pommel portion 34. On the other hand, as illustrated in FIG. 11, with the bicycle hydraulic operating device 110, the communication port 140 is disposed on a lateral side surface 114a of a main body 114. In particular, the communication port 140 extends or protrudes from the lateral side surface 114a of the main body 114 at a pommel portion 134 of the main body 114. The communication port 140 basically includes an annular protrusion 142 with a communication passageway 144. The communication passageway 144 extends through the communication port 140 such that the communication passageway 144 of the communication port 140 fluidly communicates with the cylinder bore 60 of the hydraulic cylinder housing 56 (e.g., a hydraulic cylinder) via a fluid reservoir tank 154. In the illustrated embodiment, the communication passageway 144 of the communication port 140 has an outer end opening 144a that opens upward white the bicycle hydraulic operating device 110 is in an installed position, and an inner end opening 144b that opens in an inner side surface 154a of the fluid reservoir tank 154. The inner end opening 144b is also located above a bottom face 170b of the fluid reservoir tank 154 while the bicycle hydraulic operating device 110 is in the installed position. With this configuration, the communication port 140 communicates the fluid reservoir tank 154 with an external space outside the main body 114 via the communication passageway 144. In the illustrated embodiment, the communication port 140 extends outward from a right side surface (i.e., the lateral side surface 114a) of the main body 114. It will be apparent to those skilled in the bicycle field that the configuration of the communication port 140 can be adapted to a left side surface of the main body 114 that is laterally opposite the right side surface.

Figure 12:
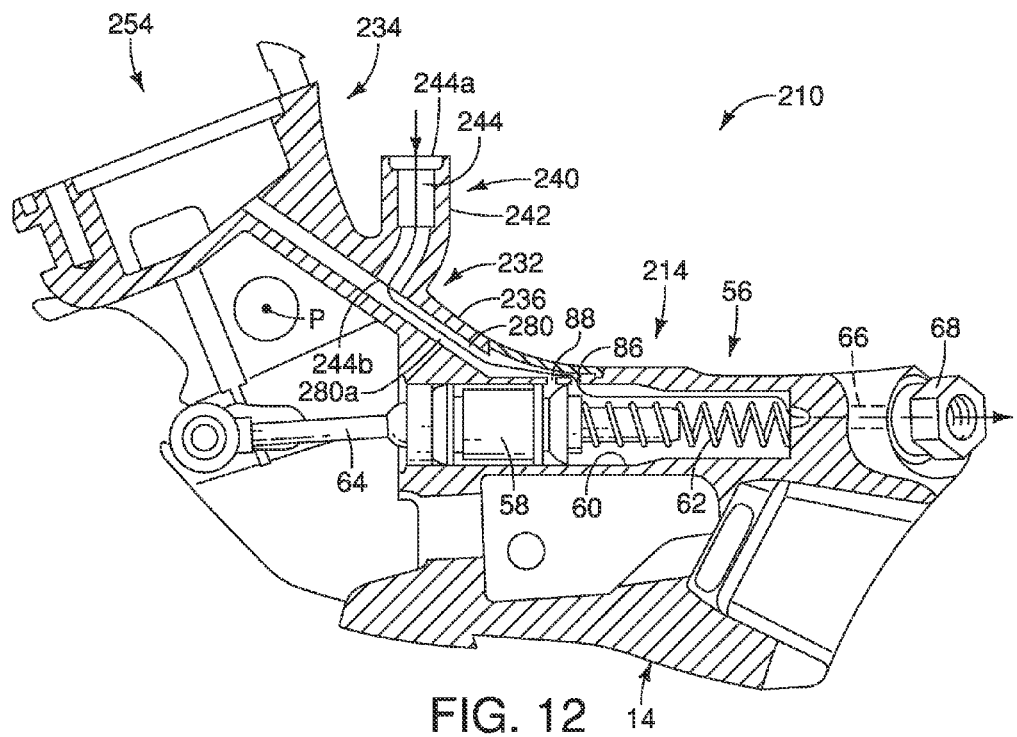
FIG. 12 is a center longitudinal cross sectional view of a main body of a bicycle hydraulic operating device in accordance with a third embodiment.

Referring now to FIG. 12, a bicycle hydraulic operating device 210 (e.g., a bicycle hydraulic component operating device) is illustrated in accordance with a third embodiment. The bicycle hydraulic operating device 210 is basically identical to the bicycle hydraulic operating device 10, except for a location of a communication port 240. In view of the similarity between the first and third embodiments, the bicycle hydraulic operating device 210 will not be discussed in detail for the sake of brevity. Thus, the descriptions of the parts of the third embodiment that are identical or nearly identical to the parts of the first embodiment may be omitted for the sake of brevity. Also in view of the similarity between the first and third embodiments, the parts of the third embodiment that are identical in function to the corresponding parts of the first embodiment will be given the same reference numerals as the parts of the first embodiment, but increased by two hundred.

With the bicycle hydraulic operating device 10 in accordance with the first embodiment, the communication port 40 extends from the top surface 36 of the main body 14 at the pommel portion 34. On the other hand, as illustrated in FIG. 12, with the bicycle hydraulic operating device 210, the communication port 240 is disposed on a top surface 236 of the main body 214 at a gripping portion 232 of the main body 214. In particular, the communication port 240 extends or protrudes from the top surface 236 of the gripping portion 232. The communication port 240 basically includes an annular protrusion 242 with a communication passageway 244. The communication passageway 244 extends through the communication port 240 such that the communication passageway 244 of the communication port 240 fluidly communicates with the cylinder bore 60 of the hydraulic cylinder housing 56 (e.g., a hydraulic cylinder) via a part of an internal passageway 280 that extends between the cylinder bore 60 and a fluid reservoir tank 254. In the illustrated embodiment, the communication passageway 244 of the communication port 240 has an outer end opening 244a that opens upward white the bicycle hydraulic operating device 210 is in an installed position, and an inner end opening 244b that opens in an inner peripheral face 280a of the internal passageway 280 at a longitudinal middle portion of the internal passageway 280. With this configuration, the communication port 240 communicates the fluid reservoir tank 254 with an external space outside the main body 214 via a portion of (e.g., at least a part of) the internal passageway 280 and the communication passageway 244. In the illustrated embodiment, the communication port 240 extends outward from the gripping portion 232 of the main body 214. It will be apparent to those skilled in the bicycle field that the configuration of the communication port 240 can be disposed on a pommel portion 234 of the main body 214 such that the communication passageway 244 of the communication port 240 has the inner end opening 244b that opens in the inner peripheral face 280a of the internal passageway 280 at a longitudinal middle portion of the internal passageway 280.

In understanding the scope of the present invention, as used herein to describe the above embodiment(s), the following directional terms "forward", "rearward", "above", "downward", "vertical", "horizontal", "below" and "transverse" as well as any other similar directional terms refer to those directions of a bicycle equipped with the bicycle hydraulic component operating device. Accordingly, these terms, as utilized to describe the bicycle hydraulic component operating device should be interpreted relative to a bicycle equipped with the bicycle hydraulic component operating device as used in an upright riding position on a horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the bicycle field from this disclosure that various changes and modifications can be made herein without departing from the scope of the invention as defined in the appended claims. For example, while the present invention has been explained as a bicycle hydraulic brake operating device, the present invention can also apply to other bicycle component operating device. Also for example, the present invention can apply to a bicycle hydraulic component operating device for bicycle speed changing device, e.g. derailleur, internal hub and so on.

It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic component operating device comprising:
    a main body including a handlebar mounting portion located at a first end of the main body, a pommel portion located at a second end of the main body, and a gripping portion disposed between the handlebar mounting portion and the pommel portion;
    a hydraulic cylinder;
    a piston movably disposed within the hydraulic cylinder;
    an operating lever pivotally disposed around a pivot axis relative to the main body, the pivot axis being located at the second end of the main body, the operating lever being operatively connected with one of the hydraulic cylinder and the piston to generate a hydraulic force in response to pivotal movement of the operating lever relative to the main body;
    a fluid reservoir tank in fluid communication with the hydraulic cylinder; and
    a communication port in communication with the fluid reservoir tank.

2. The bicycle hydraulic component operating device according to claim 1, wherein
    the communication port is disposed on a top surface of the main body.

3. The bicycle hydraulic component operating device according to claim 2, wherein
    the communication port includes a protrusion extending from the top surface of the main body at the pommel portion.

4. The bicycle hydraulic component operating device according to claim 1, wherein
    the communication port is disposed on a lateral side surface of the main body.

5. The bicycle hydraulic component operating device according to claim 4, wherein
the communication port includes a protrusion extending from the lateral side surface of the main body at the pommel portion.

6. The bicycle hydraulic component operating device according to claim 1, wherein
the communication port has a communication passageway that fluidly communicates with the hydraulic cylinder via the fluid reservoir tank.

7. The bicycle hydraulic component operating device according to claim 6, wherein
the communication passageway of the communication port has an inner end opening in an inner peripheral face of the fluid reservoir tank, the inner end opening of the communication passageway of the communication port being located above a bottom face of the fluid reservoir tank while the bicycle hydraulic component operating device is in an installed position.

8. The bicycle hydraulic component operating device according to claim 1, wherein
the fluid reservoir tank fluidly communicates with the hydraulic cylinder via an internal passageway that extends therebetween, and
the communication port has a communication passageway that fluidly communicates with the hydraulic cylinder via at least a part of the internal passageway.

9. The bicycle hydraulic component operating device according to claim 8, wherein
the communication passageway of the communication port has an inner end opening in an inner peripheral face of the internal passageway at a longitudinal middle portion of the internal passageway.

10. The bicycle hydraulic component operating device according to claim 1, further comprising
a handlebar mounting member attached to the handlebar mounting portion of the main body,
the hydraulic cylinder has a center axis that is laterally offset from a center axis of the handlebar mounting member.

11. The bicycle hydraulic component operating device according to claim 10, wherein
the handlebar mounting portion includes a handlebar contacting surface configured to mate with a forward facing surface of a downwardly curved portion of a dropdown bicycle handlebar in an installed state of the handlebar mounting portion with respect to the dropdown handlebar, the handlebar contacting surface extending beyond the handlebar mounting member along the forward facing surface.

12. The bicycle hydraulic component operating device according to claim 1, wherein
the communication port has a funnel mounting portion to which an oil funnel is configured to be mounted.

13. The bicycle hydraulic component operating device according to claim 1, wherein
the communication port is disposed on a top surface of the gripping portion of the main body.

14. The bicycle hydraulic component operating device according to claim 1, wherein
the communication port has an outer end opening that is configured as an inlet of the fluid reservoir tank for bleeding hydraulic fluid into the hydraulic cylinder.

15. The bicycle hydraulic component operating device according to claim 1, wherein
the communication port has an outer end opening that is configured as an outlet of the fluid reservoir tank for bleeding hydraulic fluid into the hydraulic cylinder.

16. The bicycle hydraulic component operating device according to claim 1, wherein
the communication port has a communication passageway with an outer end opening that opens upward while the bicycle hydraulic component operating device is in an installed position.

17. The bicycle hydraulic component operating device according to claim 1, wherein
the handlebar mounting portion and the gripping portion of the main body are integrally formed as a one-piece, unitary member.

18. The bicycle hydraulic component operating device according to claim 1, further comprising
a grip cover made of an elastic material, the grip cover being configured and arranged to at least partially cover the gripping portion of the main body.

19. The bicycle hydraulic component operating device according to claim 1, wherein
a top surface of the main body has a transition point disposed between the first end and the second end, the top surface being substantially horizontal on a first end side of the transition point and more vertical than horizontal on a second end side of the transition point in an installed state of the handlebar mounting portion with respect to a dropdown bicycle handlebar,
the pommel portion is located on the second end side of the transition point.

20. The bicycle hydraulic component operating device according to claim 1, wherein
the fluid reservoir tank is located on the pommel portion,
the pivot axis of the operating lever is positioned below the fluid reservoir in an installed state of the handlebar mounting portion with respect to a dropdown bicycle handlebar.

* * * * *